United States Patent
Kish

[11] 3,942,333
[45] Mar. 9, 1976

[54] SUCTION THROTTLING VALVE
[75] Inventor: Arthur S. Kish, Lyndhurst, Ohio
[73] Assignee: Murray Corporation, Cockeysville, Md.
[22] Filed: Nov. 13, 1974
[21] Appl. No.: 523,224

[52] U.S. Cl. .............. 62/217; 137/489.3; 137/510
[51] Int. Cl.² ....................................... F25B 41/04
[58] Field of Search .......... 62/217, 224; 137/489.3, 137/510

[56] References Cited
UNITED STATES PATENTS

| | | | |
|---|---|---|---|
| 3,296,816 | 1/1967 | Weibel, Jr. et al. | 62/217 X |
| 3,525,234 | 8/1970 | Widdowson | 62/217 |
| 3,564,865 | 2/1971 | Spenser et al. | 62/217 |
| 3,744,268 | 7/1973 | Widdowson | 62/217 |
| 3,800,551 | 4/1974 | Weibel, Jr. et al. | 62/217 |
| 3,810,488 | 5/1974 | Orth et al. | 62/217 |

Primary Examiner—William F. O'Dea
Assistant Examiner—Ronald C. Capossela
Attorney, Agent, or Firm—Isler and Ornstein

[57] ABSTRACT

A suction throttling valve is provided which is especially adapted for use as a part of a compact unit consisting of a thermostatic expansion valve, a suction throttling valve, and a receiver-dryer, in an automotive air conditioning system. The suction throttling valve is characterized by the incorporation therein of a bellows assembly of unique construction, which includes a bellows, an evacuating tube for evacuating the bellows to a predetermined pressure, and a needle valve. The bellows assembly can be easily and quickly adjusted relatively to the valve housing, in a manner such as to obviate the use of extremely expensive and sophisticated testing equipment. Construction has also been simplified to eliminate certain parts previously used in other valves of this character.

7 Claims, 11 Drawing Figures

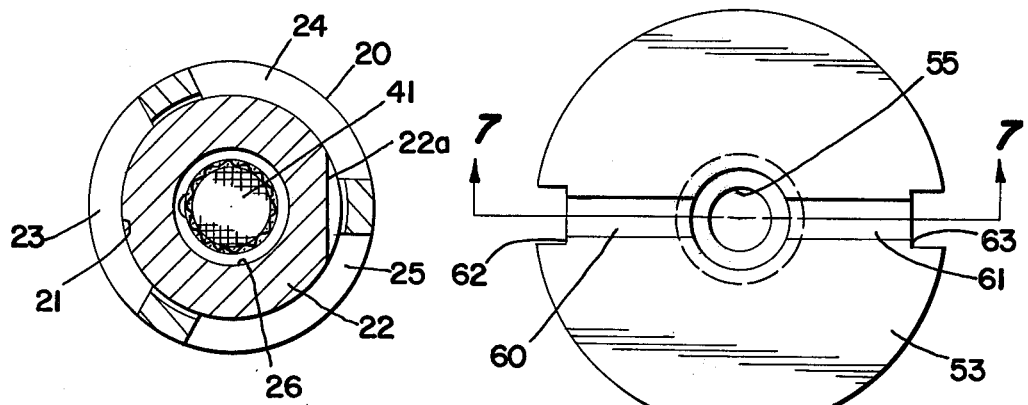
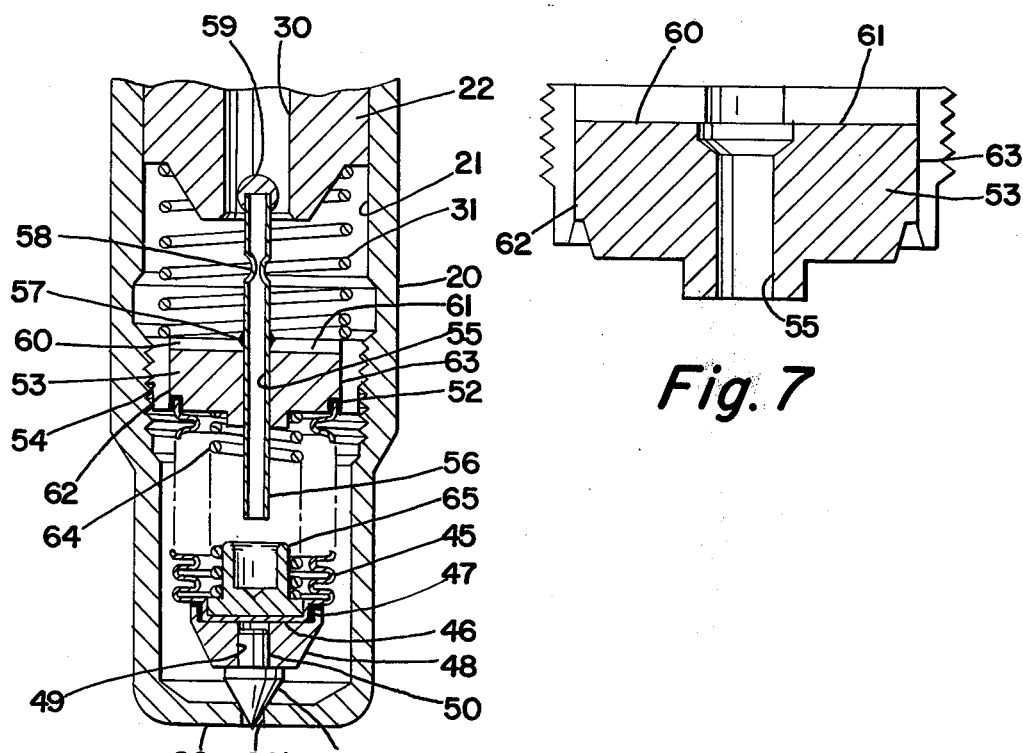

SUCTION THROTTLING VALVE

In U.S. Pat. No. 3,525,234, a suction throttling valve is disclosed, which is especially designed for use in a compact unit combining it with a receiver and a removable thermostatic expansion valve.

The suction throttling valve is held in place by a projection of a removable wall which engages a perforated plate which is a part of the valve assembly.

The suction throttling valve includes a one-piece cup-shaped housing containing an enlarged bore which slidably receives a piston valve. The piston valve contains a central recess having side outlets communicating with an annular groove which, in turn, is connected by a restricted passage to a spring chamber containing a supporting coil spring beneath the piston valve. This spring, together with the pressure in the spring chamber, controls the position of the piston valve in conjunction with the pressure applied to the top of the piston valve beneath the aforesaid perforated plate.

The pressure in the spring chamber is controlled by a sealed bellows located beneath the spring chamber. The top of the bellows is supported by and bonded to a cup-shaped press-fitted perforated bellows support which also serves as a spring retainer for the bottom of the spring. The housing is provided with a closing wall at the bottom containing an outlet opening and a self-aligning valve seat disc for a valve which has a cone-shaped lower needle which is adapted to extend into and close an aperture in the disc. The upper surface of the bottom wall is plane and smooth to make a seal surface with the flat bottom face of the seat disc surrounding the aforesaid outlet opening. The bottom flat surface of the seat disc is held against the flat upper surface of the bottom wall by a weak coil spring which extends between the bottom of the bellows and a shoulder on the rim of the seat disc. This flat upper surface allows the seat disc and its aperture to shift laterally relative to the closed bottom of the bellows to align this aperture with the conically pointed valve needle.

The bellows contains an interior spring extending between the bottom of the bellows and an internal upper spring retainer. The conically pointed valve needle is in the form of a pin which is press-fitted through the central aperture in the closed bottom end of the bellows and extends coaxially upwardly a sufficient distance to engage the upper internal spring retainer when the bellows is partially collapsed to prevent the complete collapse of the bellows.

The internal spring within the bellows, together with the spring of the bellows itself and the weak coil spring determine the pressure at which the bellows will collapse. This collapsing pressure is selected to cause the needle valve to be closed whenever the absolute pressure within the evaporator shown in the patent falls substantially below the freezing point of water. This pressure and temperature is determined by determining the temperature at which frosting of the evaporator will begin under adverse operating conditions, a suitable setting being about 29 to 30 lbs. gage of 43.2 to 44.2 lbs. per square inch absolute. Additional calibration is provided by the press fit location of the bellows support which determines the location of the upper end of the bellows.

The suction throttling valve, as thus described, consists of an excessive number of parts which are difficult to assemble, and which substantially increase the cost of manufacture and assembly.

The pressure setting of the needle valve is accomplished by press-fitting of the perforated bellows support, designated by numeral 193 in the patent, to a fixed point within the housing 171, and the fact that this support is bonded to the upper end of the bellows precludes any adjustment of the bellows relatively to the housing. The determination of this fixed point setting, combined with the fact that the bellows does not have an evacuating tube, requires the use of extremely expensive and sophisticated testing equipment in order to determine the precise fixed point at which the bellows support should be located.

I have found that a suction throttling valve of the aforesaid character can be manufactured with a minimum number of parts of relatively low cost, and assembled without difficulty, to provide a highly desirable valve which is especially adapted for replacement purposes.

I have found, also, that by providing a convenient means of adjusting the location of the bellows relatively to the valve housing, and by incorporating a bellows evacuating tube in the bellows assembly, I can provide a suction throttling valve of this character which does not require the use of expensive and highly sophisticated testing equipment, to which reference has been made.

Other objects and advantages of the invention will become apparent in the course of the following description, taken in conjunction with the drawings forming a part of this application, and wherein FIG. 1 is a top plan view of a suction throttling valve, embodying the invention;

FIG. 4 is a transverse cross-sectional view, taken on the line 4—4 of FIG. 3;

FIG. 5 is a fragmentary cross-sectional view, taken on the line 5—5 of FIG. 3;

FIG. 6 is a top plan view of the adjusting nut of the valve;

FIG. 7 is a cross-sectional view, taken on the line 7—7 of FIG. 6;

Figure 1:
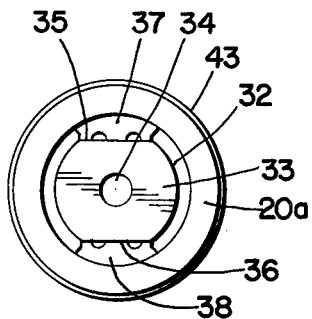

Referring more particularly to the drawings, the suction throttling valve comprises a one-piece cup-shaped body or housing 20 having an enlarged bore 21 which slidably receives a piston valve 22. The piston valve 22 is adapted to cover and uncover ports 23, 24 and 25 in the side wall of the body or housing 20.

The piston valve 22 is provided with a central recess 26 having an inclined outlet 27 connecting with an annular groove 28 in the exterior of the piston valve.

The piston valve 22 is also provided with an axial passageway 29 which interconnects the central recess 26 with an enlarged central passageway or bore 30 in the lower portion of the piston valve.

The portion of the bore 21 below the piston valve 22 provides a spring chamber containing a supporting coil spring 31 beneath the piston valve. The spring 31 together with the pressure in the spring chamber 21 controls the position of the piston valve in conjunction with the pressure applied to the top of the piston valve beneath the perforated member 32. This perforated member 32 is a one-piece stamping which comprises a flat upper portion 33 having a central opening 34, spaced flanges 35 and 36 depending from diametrically-opposite edges of the portion 33 and terminating respectively in radially-extending flanges 37 and 38. The flanges 35 and 36 are provided with elongated openings 39.

Figure 3:
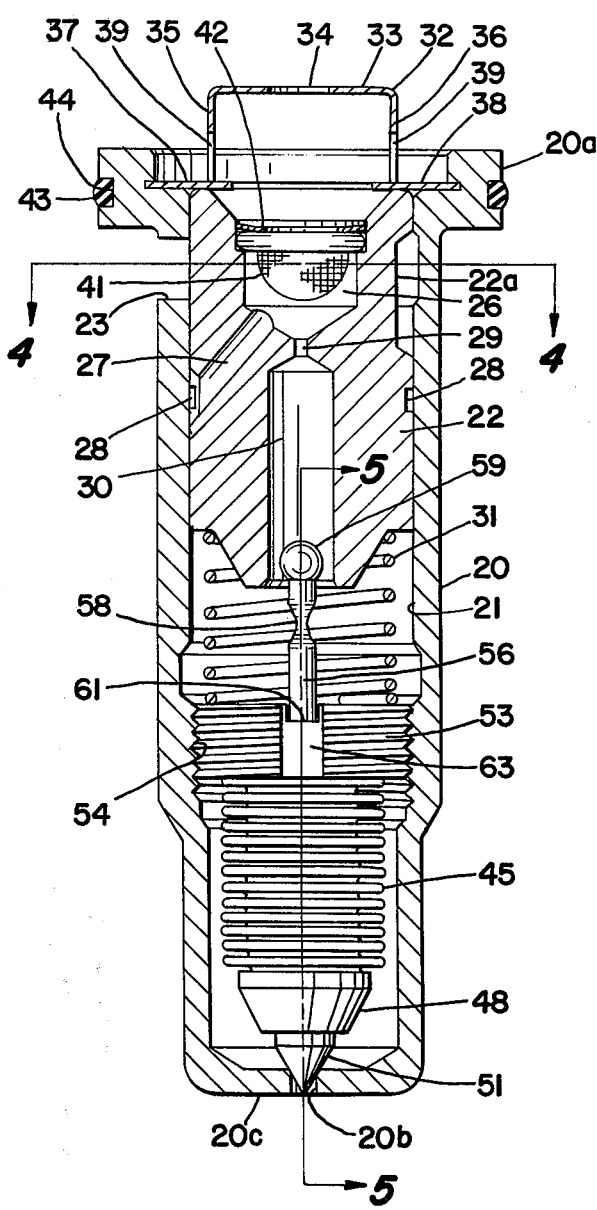
FIG. 3 is a cross-sectional view, on an enlarged scale, taken on the line 3—3 of FIG. 2.
Figure 8:
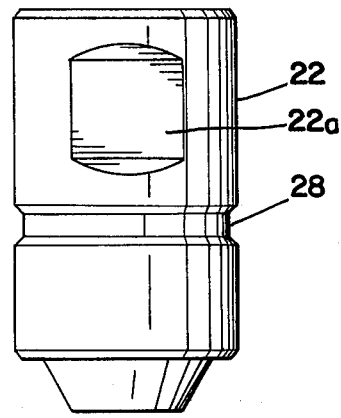
FIG. 8 is a side elevational view of the piston valve of the suction throttling valve.
Figure 9:
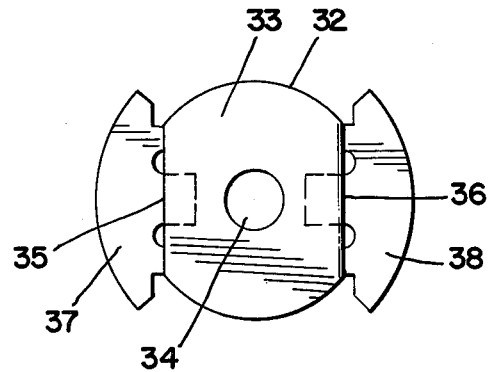
FIG. 9 is a top plan view of a perforated member which holds the suction throttling valve in place in the unit which combines the valve with a receiver and a removable thermostatic expansion valve.
Figure 10:
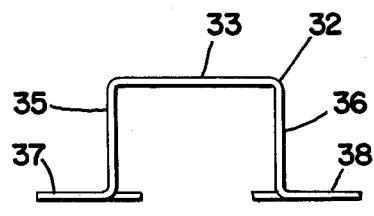
FIG. 10 is a side elevational view of the perforated member of FIG. 9, as viewed from the bottom of FIG. 9.
Figure 11:
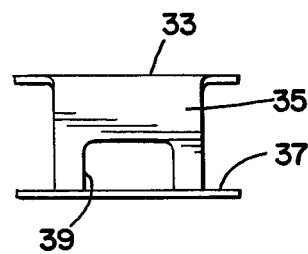
FIG. 11 is a side elevational view of the perforated member of FIG. 9, as viewed from the left side of FIG. 9.

The flanges 35 and 36 are resiliently movable toward each other, so that the perforated member 32 may be assembled with the valve body 20 by moving these flanges toward each other, locating the member 32 in the approximate position shown in FIGS. 1 and 3, and then releasing the flanges 35 and 36, to cause the outer edges of the flanges 37 and 38 to slide into an annular groove 40 in the valve body 20, thereby securely locking the member 32 to the valve body. The member 32 is adapted to engage a removable wall (not shown) which, when removed, provides complete access to the chamber in the aforesaid combined unit which contains the suction throttling valve, and thus serves to hold the throttling valve in place in such unit.

The recess 26 is covered by a concave screen 41 which stops the flow of any particles in the refrigerant, and is frictionally held in place by means of a lock washer 42.

The valve housing 20 has an annular upper flange 20a which is adapted to rest upon an annular shoulder of the chamber (not shown) of the unit in which the suction throttling valve is mounted. The space between such chamber and the flange 20a is sealed by means of an O-ring 43, which is mounted in an annular recess 44 in the periphery of the flange 20a.

The pressure in the chamber in which the spring 31 is mounted, and which pressure has been referred to above, is controlled by a sealed bellows 45, which is disposed below the spring 31.

The bellows 45 is part of a bellows assembly or unit, which is best seen in FIGS. 3, 5, 6 and 7, and will now be described.

The bellows 45 has a closed cup-shaped lower end 46 (see FIG. 5) to the periphery of which is soldered or brazed, as by a solder or braze ring 47, a pilot valve sub-assembly, comprising a valve adaptor 48 having a central bore 49, and a valve stem 50 which is press-fitted in the bore 49 and is provided with a cone-shaped needle 51. The needle 51 constitutes a valve which is adapted to extend into and close an aperture 20b in the bottom wall 20c of the housing 20.

The top of the bellows 45 is open and its upper edge is soldered or brazed, as by a solder or braze ring 52, to the periphery of an adjusting nut 53. The nut 53 is threadedly secured to internal threads 54 on the inner wall of the housing 20.

The nut 53 is provided with an axial bore 55, through which an evacuating tube 56 extends from the interior of the bellows 45 to a point within the lower portion of the central passageway or bore 30 of the piston valve 22. The tube 56 is soldered or brazed to the nut 53, as by means of a solder or braze ring 57. The tube 56 is used for the purpose of evacuating the bellows to a pressure within the range of 29 to 30 inches of mercury, and after such evacuation, the tube is sealed by pinching it, as at 58, and dip soldering the end of the tube, as at 59.

The nut 53 is provided in its upper end with spaced aligned slots 60 and 61, adapted to be engaged by a spanner tool or the like, whereby the nut 53, and consequently, the entire bellows assembly, may be adjusted longitudinally of the housing 20, for a purpose to be presently described. It may be noted, in this connection, that the upper end of the spring 31 is in engagement with the piston valve 22, while the lower end of the spring rests upon the nut 53.

The adjusting nut 53 is also provided adjacent the radially outer ends of the slots 60 and 61, with downwardly extending slots 62 and 63, which provide vertical passageways for the passage of refrigerant between the chamber 21 and the portion of the interior of the housing 20 which is below the nut 53.

The bellows 45 contains an interior coil spring 64 extending between the bottom of the nut 53 and a spring support or stop 65, which, in turn, is supported by and within the cup-shaped lower end 46 of the bellows.

The spring 64 together with the spring of the bellows 45 determines the pressure at which the bellows will collapse. This collapsing pressure is selected to cause the needle valve 51 to be closed whenever the absolute pressure within the evaporator of the air conditioning system falls substantially below the freezing point of water. This pressure and temperature is determined by determining the temperature at which frosting of the evaporator will begin under adverse operating conditions. A suitable setting is about 29 to 30 lbs. gage of 43.2 to 44.2 lbs. per square inch absolute. Additional calibration is provided by the press fit location of the bellows support 193 in the aforesaid Widdowson patent, which determines the location of the upper end of the bellows 191 in that patent. Once the press fit location of that bellows support is determined, it is virtually impossible to change its location, so that the location is, in effect, a fixed location.

In the present invention, however, the location of the nut 53 may be adjusted in the manner described above, so that the setting at which the needle valve will close can be easily, efficiently, and accurately determined.

This adjustability, combined with the use of the evacuating tube, by means of which the bellows can be easily and quickly evacuated through the use of inexpensive and readily available equipment, obviates the use of extremely expensive and sophisticated testing equipment, as required in the bellows of the aforesaid Widdowson patent.

Moreover, the suction throttling valve of this invention has been simplified over that shown in the aforesaid U.S. Pat. No. 3,525,234 by the elimination of certain parts of the latter valve, such, for example, as the part 199, the spring 222, and the retainer for the upper end of the valve 220, and the location of the needle valve 51 and part 48 completely externally of the bellows.

The use or operation of the suction throttling valve of the present invention is similar in many respects to that of the corresponding valve in U.S. Pat. No. 3,525,234, and reference to that patent may accordingly be had for an explanation of such use or operation.

However, the use or operation of the present valve may be described as follows:

With the automobile engine turned off and the car parked in a garage, the bellows 45 would be in collapsed condition, and the tube would be resting against the stop 65, so that the needle 51 would be disengaged or unseated from the passageway 20b, thereby opening this passageway.

At the same time, the spring 31 would be holding the piston 22 against the member or stamping 33. There is then a flow of Freon through the screen 41, through passageway 29, down through passageway 30 and slots 62 and 63 of the nut 53, into the bellows chamber and out of the passageway 20b.

If the car is parked in a garage and the ambient temperature in that garage is 65° F., then there will be 65 pounds of pressure throughout the enclosed or hermetically sealed Freon system.

If, under these conditions, the car engine is started and the air-conditioner turned on, the compressor of the air-conditioning system will start to draw the pressure down to below 28 pounds, causing the bellows to expand and the needle 51 to seat upon and close the passageway 20b. At the same time, the piston 20 will compress the spring 31 and open the slots 23, 24 and 25.

As the car proceeds along the road, and the temperature in the passenger compartment of the car increases, this temperature is reflected into the suction throttling valve by an increase in pressure in the evaporator of the air-conditioning system, which, in turn, is reflected onto the bellows assembly. The higher pressure in the bellows chamber area of the valve will cause the bellows 45 to collapse.

The function of the bellows is to open and close rapidly. In opposite reaction, the piston 22 will close when the needle valve 51 of the bellows assembly closes the passageway 20b, the piston 22 closes the slots 23, 24 and 25. When the needle valve opens, the pressure behind the piston will drop, and the pressure ahead of the piston will force the piston back. As soon as the needle closes, the pressure begins to build up behind the piston and moves it back to close the slots.

The suction throttling valve actually operates between the evaporator and compressor of an air-conditioning unit only. Its function is to starve and flood the compressor when the temperature in the evaporator increases or decreases. In other words, it constitutes an automatic defrosting valve for the evaporator.

Figure 2:
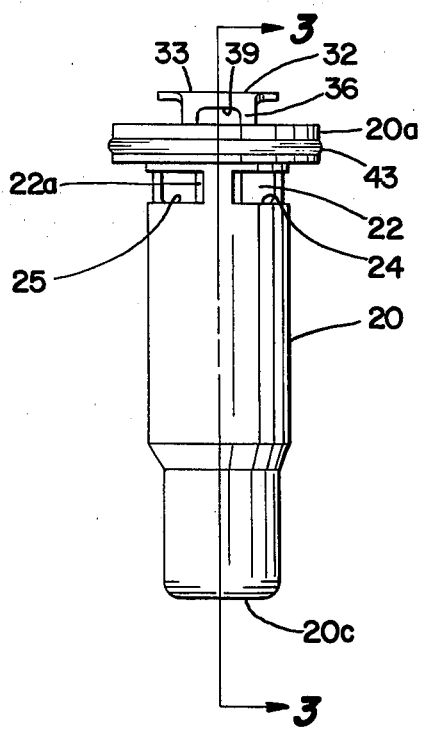
FIG. 2 is a side elevational view of the valve, as viewed from the bottom of FIG. 1.

As seen in FIGS. 2, 3 and 4, the piston 22 is provided with a flat 22a, which permits an escape of pressure from the outer surface of the piston. It also permits starting of motion of the piston and allows escape of pressure through the passageway created by the flat 22a and the slotted openings 23, 24 and 25.

The inclined passageway 27 allows the mixture of liquid Freon and refrigerant lubricant, which is normally used in the air-conditioning system, to enter the groove 28 and act as a liquid seal between the piston 22 and the wall of the bore 21 of the body or housing 20. This liquid seal, of course, aids in the up and down or open to closed movement of the piston 22. The groove 28, in other words, being moistened with the liquified mixture of Freon and refrigerant lubricant, acts as a seal to allow the piston to be lifted or depressed by pressure, and seals off the clearance between the piston and the housing or cylinder 20.

It is thus seen that I have provided a suction throttling valve which fulfills all of the stated objects of the invention.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a suction throttling valve of the character described, a cup-shaped valve body having an open top and a closing bottom wall provided with a central aperture, said body having ports below said open top communicating the interior of said body with the space exteriorly of said body, a piston valve slidably mounted in the upper portion of said body and adapted to cover and uncover said ports, the portion of said body below said piston valve constituting a spring chamber, means for controlling the position of said piston valve, said means comprising a supporting coil spring mounted in said spring chamber and acting in conjunction with fluid pressure in said spring chamber and fluid pressure applied to the top of the piston valve, means for controlling the fluid pressure in said spring chamber, said last-named means consisting of a bellows assembly comprising a bellows having a closed lower end and an open upper end, and a nut secured to and closing said open upper end of the bellows, said nut being in threaded engagement with the inner wall of said body, whereby said bellows assembly may be rotated to vary or adjust the axial position of said assembly relatively to said body, and a pilot valve subassembly secured to the lower end of said bellows, said subassembly comprising a needle adapted to close said aperture upon expansion of said bellows.

2. A suction throttling valve, as defined in claim 1, wherein said nut is provided at its periphery with slots disposed diametrically from each other and providing passageways for flow of a refrigerant from above said nut to below said nut.

3. A suction throttling valve, as defined in claim 2, including means for rotating said nut.

4. A suction throttling valve, as defined in claim 3, including a bellows evacuating tube mounted axially in said nut and extending from the space within said bellows to the space above said bellows assembly.

5. A suction throttling valve, as defined in claim 4, wherein a stop element is disposed within the lower end of said bellows, and a compression coil spring is interposed between said nut and said stop element.

6. A suction throttling valve, as defined in claim 5 in which said pilot valve sub-assembly comprises a valve adaptor secured to the lower end of said bellows, and a cone-shaped needle having a stem mounted in and disposed axially of said adaptor.

7. In a suction throttling valve of the character described, a cup-shaped body having an open top and a bottom wall, said body having ports below said open top communicating with the interior of said body and with the space exteriorly of said body, a piston valve slidably mounted in the upper portion of said body and adapted to cover and uncover said ports, the portion of said body below said piston valve constituting a spring chamber, means for controlling the position of said piston valve, said means comprising a supporting coil spring mounted in said spring chamber and acting in conjunction with fluid pressure in said spring chamber and fluid pressure applied to the top of the piston valve, said piston valve having a recess in the upper end thereof, a bore in the lower end thereof adapted for the reception of a bellows-evacuating tube, and an axial passageway of a diameter smaller than that of said recess and bore into interconnecting said recess and bore, an annular groove in the periphery of said piston valve, and an inclined passageway interconnecting said recess with said groove, whereby to provide for gravity flow of a lubricant-saturated refrigerant to said groove to provide a liquid seal between said piston valve and the inner wall of said valve body.

* * * * *